UNITED STATES PATENT OFFICE.

JOHN R. YOUNG, OF NORFOLK, VIRGINIA.

PROCESS OF MAKING FERTILIZERS.

No. 897,695.  Specification of Letters Patent.  Patented Sept. 1, 1908.

Application filed April 20, 1908. Serial No. 428,097.

*To all whom it may concern:*

Be it known that I, JOHN R. YOUNG, a citizen of the United States, and a resident of Norfolk, in the county of Norfolk and State of Virginia, have invented a certain new and useful Process of Making Fertilizer, of which the following is a specification.

My invention relates to the manufacture of fertilizer in which refuse or waste materials from packing-house, fisheries or other industries, which are hereinafter termed ammoniates, are employed as a source of nitrogen and ammonia.

The object of my invention is two-fold; first, to utilize as an ammoniate, principally refuse or waste material of the packinghouse, and fisheries industries, (particularly tankage, fish-scrap, or fish chum, blood etc.) in the crude state, as it comes from the press and with its contained moisture (40 to 50% by weight), and convert it into good physical and merchantable condition without the application of artificial heat, or other special drying process, which tends to drive off the effective fertilizing principle, whereby I am enabled to effect both a large saving in ammonia, with corresponding increase in market value of the material, and a reduction in the cost of production; second, to combine with said ammoniates substances having the intrinsic qualities not only of adding fertilizing properties to the combination, but of assimilating the fertilizing properties of the ammoniate in a manner to conserve them in greater measure, and produce a fertilizing compound of proper physical condition for convenient use, and with all the several effective principles immediately and uniformly available to plant life.

My invention, therefore, consists, primarily, in taking a wet ammoniate, in the crude state as it comes from the press, and compounding therewith bone phosphate of lime and sulfuric acid, in such a manner that, by the reciprocal and combined chemical action of the ingredients, the moisture of the ammoniate, together with ammonia, is taken up, or assimilated, and an ammoniated superphosphate is produced in good physical and merchantable condition.

More specifically, my invention consists in taking crude refuse, either from the menhaden or other fisheries industries, such as fish-scrap or fish-chum, or from the packing-house industries such as tankage, and utilizing this material in the wet state, as it comes from the press, as an ammoniate, in the compounding of an ammoniated super-phosphate; such compounding being effected in such proportions and under such conditions that the moisture of the ammoniate is assimilated in the acid phosphate to such a degree that the mass, after being allowed to set a suitable time, has acquired the requisite physical condition for sale and use, and the ammonia, part of which has heretofore, been driven off and wasted, and part sealed up by the hardening of the material in artificial drying of the ammoniate previous to compounding, is conserved in the ammoniate in a freer state and made to combine with the phosphate under conditions which make it available therewith to the plant, instead of being available independently and only after the ammoniate has fermented or decayed in the ground.

The principal ammoniates that are available in carrying out my invention, may be descibed as follows: "Fish scrap" and "fish chum," are terms applied to the residue of fish after being cooked, and having the oil extracted and water pressed out. The material is a by-product chiefly of the menhaden fisheries industry, and is largely employed as an ammoniate in the manufacture of artificial fertilizers. In the crude state, as it comes from the press, it is generally called "fish chum" in which state it contains about 45 to 50 per cent. moisture, 7 to 8 per cent. ammonia, and 5 to 7 per cent. phosphoric acid, 3 to 4 per cent. of which is already in an available form for plant food. When dried to about 10 per cent. moisture it is known as "dried fish scrap", in which form it is most frequently used. The dried scrap contains, approximately, 10 to 11 per cent. ammonia and 7 to 9 per cent. phosphoric acid, about 5 per cent. of which is usually in an available form.

In warm weather, especially, crude fish chum soon decomposes, becomes putrid and sticky, and emits a foul odor. This objectionable feature is partially overcome by sprinkling the fish chum with weak sulfuric acid, which also checks the escape of ammonia. When so acidulated, the chum is commonly known as "acid fish". The offensive odor and wet sticky character of the crude fish chum—both plain and acidulated—are almost prohibitive of its transportation and manipulation, and restrict its use to isolated localities—hence it is usually worked in with dry material which acts as an absorbent, whereby its handling and manipulation are rendered less objectionable.

Tankage is the sediment or residue of refuse material of the packing-house or other industries remaining in the rendering tank after the oil and grease have been extracted therefrom and the tank water drawn off. After the material has been subjected to pressure in order to expel as much water as possible, the residue or "press cake", as it is termed, is crushed or broken up, then passed to the drier from which it emerges as "dried tankage".

Tankage contains both ammonia and phosphoric acid (or its equivalent in bone phosphate of lime) in varying percentage according to relative amount of nitrogenous and phosphatic matters contained therein.

The wet ammoniates described, shrink in weight 35 to 45 per cent. from the raw to the commercially dried material and lose several per cent. of their ammonia. The value of the ammoniates described, is dependent upon the units (or percentage) of ammonia contained therein. The objectionable features possessed by the raw materials and the expense of reducing them to good physical and transportable condition, make the crude or undried ammoniates of comparatively small commercial value. For example, ammonia obtained from crude fish costs, usually, from 30 to 40 cents per unit less than when obtained from the dried material; hence, with the percentage of ammonia in dried fish scrap (about 10 per cent.) ammonia obtained from this source costs from three to four dollars per ton more than when obtained from the crude or undried material, and when it is remembered that a relatively large percentage of ammonia is driven off by the drying process, the advantage of using the crude or green press-cake is seen to be even greater than stated.

In carrying out my invention, I employ the ammoniates herein described, either singly or in combination, in the crude or undried form, or state of moisture, substantially as they come from the press, and I combine them with bone phosphate of lime and sulfuric acid in substantially the following manner. Inasmuch as I prefer to employ crude fish in either of its forms, as fish chum or acid fish, I will describe an illustrative process in which this ammoniate is used. I take from 600 to 800 pounds of fish chum, either plain or acidulated, 700 pounds of bone phosphate of lime, and 700 pounds of strong sulfuric acid of about 66° Baumé.

The bone phosphate of lime may be obtained from any material containing or composed largely of phosphate of lime, preference, however, being given to phosphate rock and animal bone, in any of the various forms. As different materials vary in per cent. of phosphate of lime, the proportions of the ingredients of the compound may be varied to suit the strength of material used and amount of bone phosphate or phosphoric acid desired. Approximately, the bone phosphate and acid should be about the same in weight and sufficient of the ammoniate used to furnish one-half as much water, as hereinafter explained.

The quantity of ammoniate may be varied according to its per cent of moisture, which usually is from 45 to 50 per cent. of its weight, as it comes from the press, and according to the amount of ammonia desired. It is important that the phosphate rock or the material supplying the bone phosphate should be dry and finely pulverized; also, that strong acid (about 66° Baumé) be employed.

The several ingredients, in the order named, are placed in a mixer of the ordinary type employed in "wet mixing", the ammoniate and pulverized rock, or other material, first being well incorporated, after which the acid is turned in and the entire mass agitated until thoroughly mixed. When the resulting chemical action has partially subsided, and the mass begins to thicken and settle, the charge is drawn off into the "den" beneath the mixer, where the product of the day's mixing is allowed to "set" over night. The finished material is then transferred to the "dump", or pile, where it remains until properly seasoned, or until the pile has lost its heat. The compound will then be in fine mechanical and merchantable condition, being light, dry, and porous.

The chemical action and changes resulting from the compounding of crude fish scrap, plain or acidulated, with bone phosphate of lime and strong sulfuric acid, as herein described, may be thus explained:

First: The free ammonia of the fish is converted into a sulfate, thereby "fixing it" and preventing loss by volatilization.

Second: The phosphate of lime being acted upon by the sulfuric acid, superphosphate and sulfate of lime are formed, thereby rendering the phosphoric acid soluble and available as plant food.

Third: The carbonate of lime contained in the phosphatic material also being decomposed by the sulfuric acid, additional sulfate of lime is formed. The liberated carbonic acid gas, (carbon dioxid) escaping throughout the mass makes it light and porous.

Fourth: Sulfate of lime, especially in the nascent state, has a strong affinity for water. The large percentage of it formed in the compound aids effectually in reducing the moisture and setting the mass.

Fifth: The heat generated by the resulting chemical action in presence of organic matter, causes a deoxidation of a portion of the sulfuric acid liberating sulfurous acid gas, or sulfur dioxid, which acts as a powerful deodorizer and disinfectant.

The compound resulting from the combination of ingredients named and chemical action described, is an "ammoniated acid phosphate", or superphosphate, containing the combined valuable fertilizing properties of fish and bone phosphate of lime in the most available form for plant food, and makes available the valuable fertilizing materials named, in much more effective condition than heretofore obtained by merely mixing the ammoniate with the product of phosphate of lime and sulfuric acid—or "acid phosphate". In former processes employing these materials, neither the ammoniate nor the acid phosphate undergo any chemical change of condition, each ingredient retaining, in the mixture, its original character and properties. The ingredients of my compound are chemically and inseparably united in one uniform substance possessing the combined valuable properties of indistinguishable ingredients. A superphosphate, or "acid phosphate", is a compound resulting from the decomposition of phosphate of lime by sulfuric acid. When an ammoniate is decomposed jointly, or by the same reagent, with the phosphate the compound formed is an ammoniated superphosphate.

In the decomposition of the ammoniate and phosphate of lime by the sulfuric acid, soluble phosphates and sulfates are formed. Water is a constituent or essential part of these salts, and is taken up in large quantity, by the sulfate of lime especially, as "water of crystallization"; hence, in making acid phosphate, or "superphosphate", the water necessary to complete chemical action must be supplied. By the best methods in general use this is done either by employing acid reduced or diluted to about 50° Baumé (at which strength it carries about the right amount of water—or 50 lbs. to 100 lbs. of 66° acid —); or the requisite water is added separately.

I depart from the present method of employing a wet ammoniate, by which I mean an ammoniate having the requisite moisture inherent in it as a result of its production, and I utilize this inherent moisture as the water required in chemical action, instead of passing the material through the drier and driving off its water (and a good part of its ammonia as well) and then pumping water back into the mixing pan with the acid. I eliminate the drier altogether and pass the wet material directly to the mixer, where chemical action, in supplying its own needs, dries out the ammoniate far more effectually than is done by the drier, which results in a large saving in labor and fuel, a saving of ammonia, and an improved condition of the finished material.

The quantity of water required in chemical action depends on the amount of phosphate of lime decomposed. In its decomposition the phosphate of lime requires, approximately, an equal weight of 66° acid, and one half as much water. To illustrate: 1,000 pounds of phosphate rock of 70 per cent. strength would require about 700 pounds of 66° acid and one half as much water—or 350 pounds —which is sufficient for chemical requirement, evaporation, and ultimate moisture in the finished product,—about 10 per cent.

My invention possesses the important advantage of depriving crude ammoniates of their offensive odor, and other objectionable properties, and rendering them light and dry so that they can be easily milled and sown by machinery or from the hand without offense to the person, these results being accomplished by the addition of only such substances as add to their value as a fertilizer, while they retain all their own valuable fertilizing properties.

There is an important difference over the prior art in my method of taking the press cake of animal matter, with its contained moisture, and mixing them with the finely pulverized bone phosphate of lime, and then subjecting such mixture to the action of strong sulfuric acid, for, by so doing, the moisture of the ammoniate is given up to the re-action only as called for, being drawn therefrom gradually—by degrees, as required in the formation of the resulting salts, sulfate of lime, especially; hence, the acid, not being weakened through excessive dilution, attack the bone phosphate in full strength, more vigorously and effectively, with the result that a much larger proportion of phosphates is put into available form.

Heretofore it has been customary to take dried animal matter and to dilute the acid with the necessary water before adding it, and it has been proposed to take liquid containing ammoniate in solution and treat it with relatively a small quantity of acid to render soluble the contained ammonia, and to mix this with phosphatic material. But these are not the equivalent of my invention. By my process the nitrogen and ammonia are more fully preserved, and a much larger percentage of available phosphatic acid secured than is attainable by former methods. To explain more fully, by avoiding the use of "liquid" animal matter, such as animal juice or broth, urine, ammoniacal liquors, tank waters, or other forms of "fluid" animal matter, wherein water is contained largely in excess of the "solid" matters, and employing only the "solid" portion, or residue, of animal matter, herein described, remaining in the form of "press cake" after as much as possible of the water, or "fluid" part, has been expelled by pressure, and containing only such water as is held by absorption, I treat, as far as practicable, the "solid" matters only, and produce a fertilizing compound wherein are combined the concentrated valuable properties, or qualities, of its several components in the most effective form and condition for plant food; this result being attained without the agency of artificial heat or the use of "absorbents".

Having thus described my invention, what I claim and desire to secure by Letters Patent is:—

1. The process of producing ammoniated superphosphate, which consists in decomposing bone phosphate of lime with strong sulfuric acid of about 66° Baumé, in the immediate presence of undried press-cake of the herein described animal refuse containing water.

2. The process of producing ammoniated superphosphate, which consists in treating bone phosphate of lime with strong sulfuric acid in the presence of the solid part of animal refuse, herein described, containing water, and decomposing the solid matters and taking up the water and drying the product in the reaction.

3. The process of producing an ammoniated superphosphate which consists in mixing the press-cake of the herein described animal refuse, without previous drying, with bone phosphate of lime, and subjecting such mixture to the action of strong sulfuric acid, thereby decomposing the bone phosphate and solid animal matters and assimilating the moisture of the animal matter in the reaction and converting the ingredients substantially as described.

4. The process of producing ammoniated superphosphate, which consists in mixing the following ingredients in the order named and substantially in the proportions named, to wit:—with about from six hundred to eight hundred pounds of undried "press-cake" of the herein described refuse animal matter, containing about forty to fifty per cent. moisture, thoroughly incorporate about seven hundred pounds of finely pulverized bone phosphate of lime, and to said mixture add about seven hundred pounds of strong sulfuric acid (preferably 66° Baumé), agitating the mass until chemical action partially subsides, then allow the composition to set.

5. The process of producing ammoniated superphosphate, which consists in mixing undried "press-cake" of refuse animal matters, as herein described, containing about forty to fifty per cent. moisture, with finely ground or pulverized bone phosphate of lime, and then adding to said mixture sufficient strong sulfuric acid to decompose the entire mass, producing in the re-action soluble phosphates of lime, sulfate of lime, and sulfate of ammonia and sulfurous acid gas.

6. The process of producing ammoniated superphosphate, which consists in mixing the herein described animal ammoniate having absorbed therein an amount of moisture commensurate with that required in the reaction, with bone phosphate of lime, then treating the mixture with strong sulfuric acid thereby decomposing the ammoniate and bone phosphate of lime, and supplying water necessary to support the reaction, as the reaction progresses, by the decomposition of the ammoniate in which the water is absorbed.

7. The process of producing ammoniated superphosphate, which consists in mixing the herein described animal ammoniate, with bone phosphate of lime, treating the compound thus produced with strong sulfuric acid thereby supplying, as the reaction progresses, a quantity of water sufficient to prevent carbonizing the animal matter, but not in excess of that which will be assimilated in the re-action.

The foregoing specification signed at Washington D. C. this 18th day of April, 1908.

JOHN R. YOUNG.

In presence of—
HERVEY S. KNIGHT,
EDWIN S. CLARKSON.